United States Patent [19]
Adachi et al.

[11] Patent Number: 5,146,448
[45] Date of Patent: Sep. 8, 1992

[54] TIME CODE RECORDING OR REPRODUCING APPARATUS AND TIME CODE CONVERTER

[75] Inventors: Tatsuya Adachi; Kiyotaka Nagai; Yasushi Nakajima, all of Osaka; Takafumi Ueno, Nara; Naoki Ejima; Masataka Nikaido, both of Osaka, all of Japan

[73] Assignee: Matsushita Electric Industrial Co., Ltd., Osaka, Japan

[21] Appl. No.: 716,498

[22] Filed: Jun. 17, 1991

Related U.S. Application Data

[62] Division of Ser. No. 415,222, Sep. 11, 1989, Pat. No. 5,091,899.

[51] Int. Cl.$^5$ .............. G11B 27/00; G11B 3/64; G11B 27/02; G11B 5/78
[52] U.S. Cl. .............................. 369/83; 369/84; 360/13; 360/15; 360/36.1; 360/36.2
[58] Field of Search ............. 360/36.1, 36.2, 14.3, 360/32, 51, 15, 33.1; 369/83, 38.1; 341/106

[56] References Cited

U.S. PATENT DOCUMENTS

| | | | |
|---|---|---|---|
| 4,312,019 | 1/1982 | Kimura | 360/36.2 |
| 4,313,129 | 1/1982 | Fukui | 360/36.2 |
| 4,503,470 | 3/1985 | Mita et al. | 360/14.3 |
| 4,733,311 | 3/1988 | Yoshinaka | 360/36.2 |
| 4,768,105 | 8/1988 | Aoki | 360/14.1 |
| 4,788,602 | 11/1988 | Sekiguchi et al. | 360/14.3 |
| 4,937,574 | 6/1990 | Wright | 341/106 |

FOREIGN PATENT DOCUMENTS 0176324 4/1986 European Pat. Off. .
1264686 10/1989 Japan .

Primary Examiner—Stuart S. Levy
Assistant Examiner—Tan Nguyen
Attorney, Agent, or Firm—Lowe, Price, LeBlanc & Becker

[57] ABSTRACT

This invention relates to a time code recording and reproducing apparatus for recording and reproducing time codes corresponding to a digital signal. Time code converting means (100) converts a first time code into a second time code. A frame phase which occurs during the recording of input information is determined by frame timing generating means. A phase difference between a frame of the second time code and a recording frame is detected by phase difference detecting means (103). Phase difference correcting means (104) outputs a third time code on the basis of the detected phase difference. The input information is recorded together with the third time code. Thereby, the recording can be performed while the relation of the correspondence between the input information and the time code is held. In addition, the reproduction can be performed.

3 Claims, 15 Drawing Sheets

FIG. 4

| BIT\WORD | 7 | 6 | 5 | 4 | 3 | 2 | 1 | 0 |
|---|---|---|---|---|---|---|---|---|
| 0 | PACK ITEM | | | | FLAG | | | |
| 1 | SUB FRAME NUMBER 2 | | | | | | | |
| 2 | SUB FRAME NUMBER 1 | | | | | | | |
| 3 | HOUR | | | | | | | |
| 4 | MINUTE | | | | | | | |
| 5 | SECOND | | | | | | | |
| 6 | FRAME NUMBER | | | | | | | |
| 7 | PACK PARITY | | | | | | | |

FIG. 14 PRIOR ART

| INPUT SAMPLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| INPUT FRAME | 0 | | | | | 1 | | | | | | | | | 2 | | | | | | | |
| INPUT TIME CODE | 12 HOUR 32 MINUTE 45 SECOND 1 FRAME | | | | | | | | | | | | | 12 HOUR 32 MINUTE 45 SECOND 2 FRAME | | | | | | | | |
| | ← 0.2 FRAME | | | | | | | | | | | | | | | | | | | | | |
| RECORDING FRAME | 0 | | | | 1 | | | | | | | | 2 | | | | | | | | | |
| RECORDING TIME CODE | 12 HOUR 32 MINUTE 45 SECOND | 12 HOUR 32 MINUTE 45 SECOND 1 FRAME | | | | | | | | | | | 12 HOUR 32 MINUTE 45 SECOND 2 FRAME | | | | | | | | | |

FIG. 15

| TIME CODE 1 | 0 | 1 | 2 | 3 | 4 | 5 | 6 | 7 | 8 | 9 | 10 |
|---|---|---|---|---|---|---|---|---|---|---|---|

40ms

| TIME CODE 2 | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|

| TIME CODE 1 | 0 | 1 | 2 | 3 | 4 | 5 | 6 | 7 | 8 | 9 | 10 | 11 | 12 |
|---|---|---|---|---|---|---|---|---|---|---|---|---|---|

40ms

| TIME CODE 2 | 0 | 1 | 2 | 3 | 4 | 5 | 6 | 7 | 8 | 9 | 12 | 13 | 14 | 15 | 16 |
|---|---|---|---|---|---|---|---|---|---|---|---|---|---|---|---|

| INPUT SAMPLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|

INPUT FRAME: 0 | 1 | 2

INPUT TIME CODE: 12 HOUR 32 MINUTE 45 SECOND 1.0 FRAME | 12 HOUR 32 MINUTE 45 SECOND 2.0 FRAME

RECORDING FRAME: 0.2 | 1.2 | 2.2

RECORDING TIME CODE: 12 HOUR 32 MINUTE 45 SECOND 1.2 FRAME | 12 HOUR 32 MINUTE 45 SECOND 2.2 FRAME

TIME CODE RECORDING OR REPRODUCING APPARATUS AND TIME CODE CONVERTER

This application is a division of application Ser. No. 07/415,222 filed Sep. 11, 1989 now U.S. Pat. No. 5,091,899.

TECHNICAL FIELD

This invention relates to a time code recording and reproducing apparatus recording and reproducing signals of sounds, images, and others, and time codes corresponding thereto in an R-DAT (a rotary head type digital audio tape recorder), a digital VTR, and others.

BACKGROUND ART

Recently, digital techniques have been used in many fields such as an audio or a video field, and techniques of a CD player, an R-DAT, digital VTR, and others have been established.

Among them, a time code control technique has been important together with a basic technique of recording and reproducing a PCM signal, the time code control technique recording time codes in correspondence with the PCM signal and performing sync recording, sync reproducing, and sync editing by connecting a plurality of recording and reproducing apparatuses searching a head of a point of the recording or the reproducing.

In a prior art time code recording and reproducing apparatus, PCM samples are divided into frames, a time code having a minimal unit of a frame number is recorded for each frame, and one time code is given to a plurality of PCM samples belonging to one frame.

Ways of recording time codes which are defined as mentioned above are classified into two types, that is, (1) a rotary head type and (2) a fixed head type.

(1) The rotary head type

The R-DAT records time codes by a rotary head. In the R-DAT, since the frame frequency is generally 2000/60 Hz, time codes of 2000/60 frames are recorded during one second. In this case, since the time codes are recorded and reproduced by the rotary head and thus variations in relative speeds of the head and the tape are small when the tape speed varies, the range of the tape speeds which can be reproduced is large.

In the R-DAT, the reproduction of the time codes is possible between a stationary state and a 200-times speed.

(2) The fixed head type

In general, a rotary head type VTR uses a fixed head in recording time codes. Also in this case, the recording is generally performed in synchronism with a track period recorded by the rotary head. However, in the case where the time codes are recorded by the fixed head, since the recording is possible even when it is out of synchronization with the track recorded by the rotary head, the recording is possible even when time codes having different frame periods are inputted. The collection of preliminary papers of AES Tokyo Convention '87, pages 93 to 94 discloses a way of recording SMPTE time codes into an R-DAT optional track by a fixed head, the time codes having a frame frequency of about 29.97 Hz for a VTR.

(1) Problem in the fixed head type

The time code recording of the fixed head type suits to the transfer of time codes between apparatuses of different types since it can perform the recording independent of the recording frame of the rotary head even when the frame period and the phase of the input time codes disagree with the frame period and the phase of the recording apparatus. However, in the time code recording by the fixed head, since the relative speeds of the head and the tape are determined by the tape speed, there is a problem that the range of the tape speeds which can be reproduced is narrow. In addition, in the case of a recording and reproducing apparatus such as an R-DAT which has a low standard tape speed (8.15 mm/SEC), the reproduction of the time codes at the standard tape speed is difficult. In addition, in the fixed head type, since the accuracy of the attachment location of the fixed head directly affects the accuracy of the recording phase of the time codes, it is difficult to maintain the accuracy. Furthermore, the fixed head type needs the fixed head in addition to the rotary head, and it has a problem that miniaturizing the mechanism is difficult.

Therefore, it is understood that the time code recording by the rotary head type suits to an apparatus such as an R-DAT or a rotary head type VTR which records a main signal by a rotary head.

(2) Problem in the rotary head type

The time code recording of the rotary head type is an excellent way having a wide range of the tape speeds which can be reproduced, and enabling the mechanism to be simplified. However, in the recording way such as time codes of the above-mentioned R-DAT, it is difficult to perform sync editing with an accuracy lower than the frame. This is because times of a plurality of PCM samples in one frame are expressed by one time code and there is no time code below the frame.

FIG. 14 is a timing chart showing the relation between input samples and recording time codes in a prior art time code recording and reproducing apparatus.

In FIG. 14, 10 input samples are inputted as one frame, and an input time code corresponding to the input frame is inputted with an accuracy of a frame unit. A recording frame of a recording apparatus is delayed from the input frame by 0.2 frame. Since the time code has an accuracy of a frame unit only, the recording time code same as the input time code is recorded.

Therefore, the relation between the recorded PCM samples and the time codes is determined uniquely.

In order to accurately determine the relation between the time codes and the PCM samples, it is necessary to provide sync of the frame phase when the time codes are transferred between a plurality of recording and reproducing apparatuses, that is, it is necessary to provide rules that the input frame and the recording frame in FIG. 14 should be made equal. If it is done, there is no phase difference of 0.2 frame in FIG. 14 so that the first PCM sample in a frame agrees with the time denoted by the time code and subsequent PCM samples can be regarded as corresponding to the times being delayed from each other by 0.2 frame intervals.

In the case where the frame sync is required when the time codes are transferred, inconvenience sometimes occurs.

In general, the frame sync of recording and reproducing apparatuses of various types tends to be dependent upon the contents of information handled by the apparatuses or the structures of the apparatuses, and recording and reproducing apparatuses of different types tend to have different frame syncs respectively.

For example, it is about 33.37 msec in agreement with the video frame period in an NTSC color VTR, and it is 30 msec in an R-DAT.

In the case where the time codes are transferred between apparatuses which have different frame periods in this way, frame phase sync such as mentioned above is sometimes not established.

FIG. 15 is a timing chart showing the conversion of continuous time codes having a frame period ratio of 4:3.

In FIG. 15, time codes 1 are time codes transferred from a reproducing apparatus having a frame period of 40 msec, and time codes 2 are time codes converted to be recorded in a recording apparatus having a frame period of 30 msec.

In the case where the time codes 1 are continuous, the time of the first sample of a frame and the time code can be made equal by providing sync between the frame phase of the time codes 2 and the frame phase of the recording apparatus.

FIG. 16 is a timing chart showing the conversion of discontinuous time codes having a frame period ratio of 4:3. In FIG. 16, since the time codes 1 are discontinuous at the point a, the frame phase of the time codes 2 are discontinuous at the point a. In this case, if the frame phase of the time codes 2 and the recording frame phase are newly synchronized at the discontinuous point, the time of the first sample of the frame and the time code can be in agreement. In practice, since the phase of the recording frame can not be changed during the recording operation, sync can not be established and thus there is a problem that the recording must be done with the disagreement between the times of the PCM samples and the time codes.

DISCLOSURE OF THE INVENTION

A main object of this invention is to provide a time code recording and reproducing apparatus in which the time code recording of the rotary head type suited to the rotary head type recording and reproducing apparatus is a premise and in which a sub frame number being information having a unit smaller than a frame number is provided as a time code, and thereby the time of a PCM sample is expressed with an accuracy smaller than the frame unit and the relation between the time of the PCM sample and the time code can be determined uniquely even when the frame period and phase of the input time code disagree with the recording frame period and phase. FIG. 17 shows the relation between the input samples and the recording time codes in the case where sub frame numbers having a unit of 1/10 frame are introduced.

The above-mentioned object of this invention is attained by comprising time code converting means for converting a first time code into a second time code, the first time code corresponding to a given timing or a head of a frame of input information divided into frames, the second time code having a frame period different from a frame period of the input information; recording means for recording the input information; recording frame timing generating means for determining a frame phase of the recording means; phase difference detecting means for detecting a phase difference between a frame of the second time code and a recording frame; phase difference correcting means for outputting a third time code which is obtained by correcting the second input time code in accordance with the phase difference; phase synchronizing means for phase-synchronizing a frame of the third input information and the recording frame of the recording means; and reproducing means reproducing the recorded input information and the third time code; the recording means recording the third time code.

As mentioned above, in this invention, by adding the phase difference to the time code even when the frame phase of the input time code disagrees with the frame phase of the recording means, the phase difference being represented by the sub frame number of the time code, the recording can be performed while keeping constant the time relation between the input time code and the input PCM sample. In addition, the sub frame number can be "0" by synchronizing the frame phase of the input time code with the frame phase of the recording means. Furthermore, even in the case where the input time code disagrees with the frame period of the recording means, by converting the frame period of the time code, the input time code and the PCM sample can be recorded and reproduced while the relation of the correspondence between the input PCM sample and the input time code is held.

BRIEF DESCRIPTION OF THE DRAWING

FIG. 4 is a format view showing a time code recording format;

FIG. 14 is a timing chart of a prior art time code recording and reproducing apparatus;

FIG. 15 is a timing chart showing the conversion of continuous time codes;

FIG. 16 is a timing chart showing the conversion of discontinuous time codes; and FIG. 17 is a timing chart showing the relation between input samples and recording time codes in the case where sub frame numbers are introduced.

BEST MODE OF CARRYING OUT THE INVENTION

First, a description will be made on the way of conversion between time codes having different frame periods and different frame phases.

Here, a description will be made on an example where first time codes having a frame period of 40 msec are converted into second time codes having a frame period of 30 msec, and the second time codes are converted into third time codes which have a frame period of 30 msec and which have a frame phase different from that of the second time codes.

Figure 1:
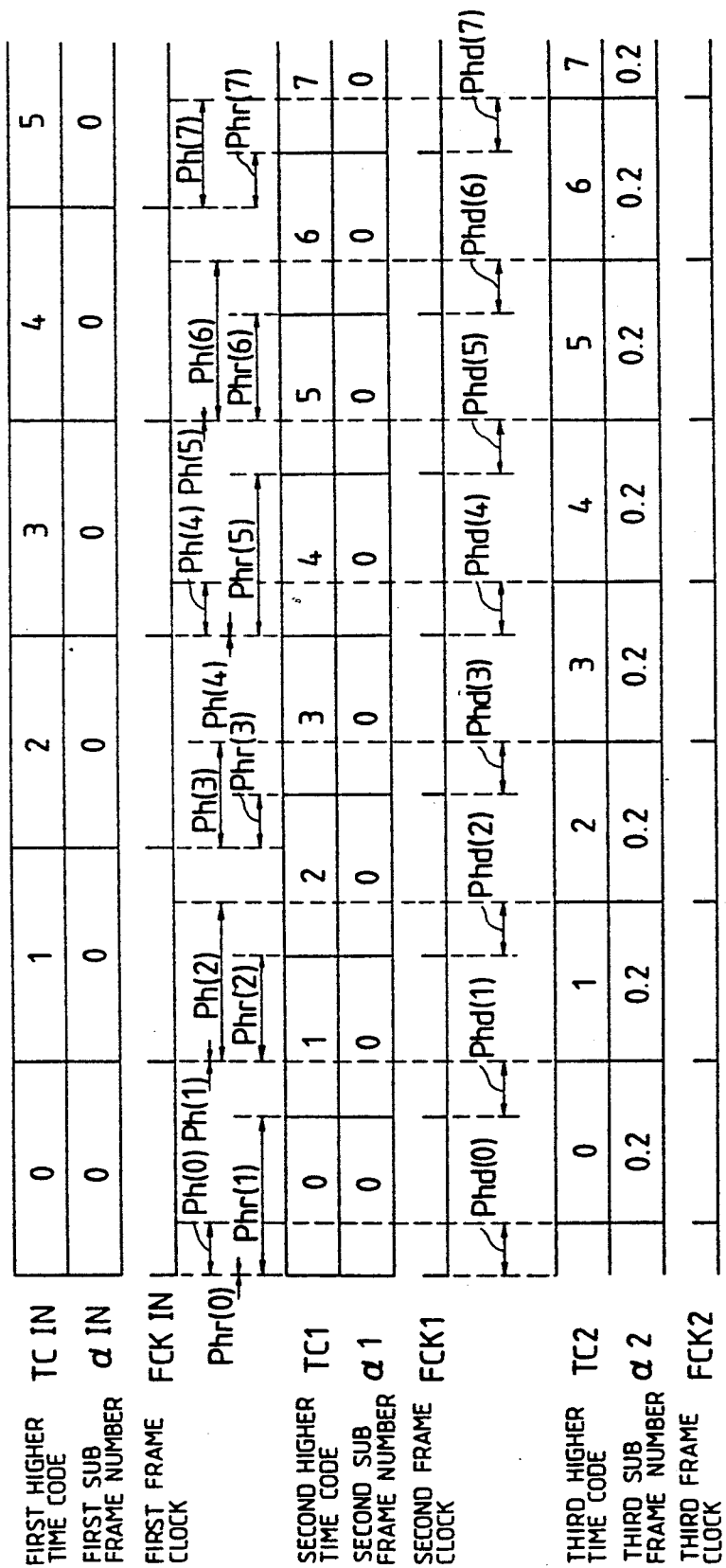
FIG. 1 is a timing chart showing the operation of time code conversion.

FIG. 1 is a timing chart showing the operation of the time code conversion.

In FIG. 1, TCIN is a first higher time code being a component represented by a unit equal to or greater than the frame of first time codes, $\alpha$IN is a first sub frame number being a component represented by a unit smaller than the frame of the first time codes, FCKIN is first frame clocks representing the start points of frames of the first time codes, TC1 is a second higher time code which occurs after the period conversion, and $\alpha$1 is a second sub frame number which occurs after the period conversion. FCK1 is first frame clocks representing the start points of frames of the time codes which occur after the period conversion. Units of the time codes which are equal to or greater than a second are 0 hour, 0 minute, and 0 second. The above-mentioned first and second time codes are converted so that the start points of 0 hour, 0 minute, 0 second, and 0 frame will be in agreement.

Since the above-mentioned time codes of the two types have different frame periods, the numbers of frames in one second and the start points of frames are different. The difference in time between the start points of the frames of the above-mentioned time codes of the two types is 0 at 0 hour, 0 minute, 0 second, and 0 frame, and sequentially varies during a later period.

The time difference between the start points of the frames of the time codes of the two types, which occurs when the start points of 0 hour, 0 minute, 0 second, and 0 frame of the above-mentioned time codes of the two types are equalized and which is represented by use of a reference being the start point of each frame of the first time codes, is referred to as reference phase information meaning information specifying the phase of the second time codes. In FIG. 1, Phr(i) denotes the reference phase information (i denotes a frame number of the second time codes).

The first time codes which occur before the conversion and the second time codes which occur after the period conversion have equal start points of 0 hour, 0 minute, 0 second, and 0 frame. In the case where time codes are transferred between recording and reproducing apparatuses of different types, the start points of 0 hour, 0 minute, 0 second, and 0 frame of the time codes of the two types are generally unequal. Therefore, the conversion into third time codes which have the same period as that of the second time codes and which have a phase different from that of the second time codes is necessary.

TC2 is a third higher time code which occurs after the phase conversion, and $\alpha$2 is a third sub code number which occurs after the phase conversion. FCK2 is second frame clocks representing the start points of frames of time codes which occur after the phase conversion.

Since the periods of the second time codes and the third time codes are equal, the time difference between the start points of frames of the second time codes and the third time codes is constant as long as the time codes are continuous. The time difference between the start points of the frames of the second time codes and the third time codes is referred to as a phase difference. In FIG. 1, Phd(j) denotes the phase difference (j denotes a frame number of the third time codes).

The time difference between the start points of the frames of the first time codes and the third time codes, which is represented by use of a reference being the start point of each frame of the first time codes, is referred to as phase information meaning information which specifies the phase of the third time codes. In FIG. 1, Ph(j) denotes the phase information (j denotes a frame number of the third time codes).

Figure 2:
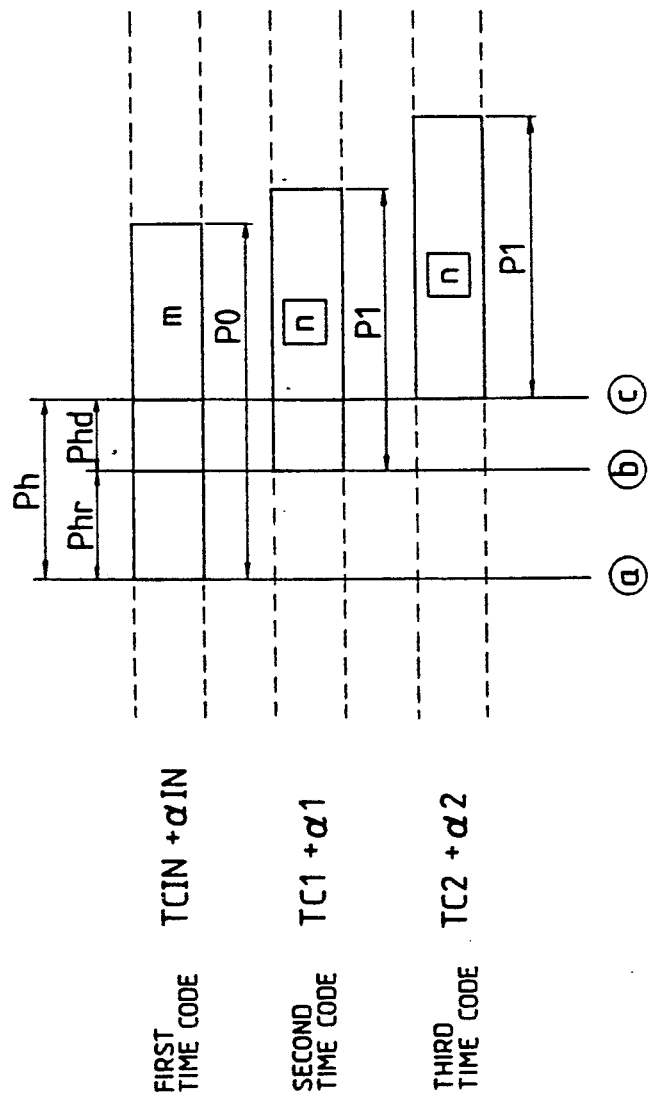
FIG. 2 is a timing chart showing the relation among time codes of three types.

FIG. 2 shows the relation among the above-mentioned time codes of the three types. In FIG. 2, TCIN+$\alpha$IN denotes the first time codes, TC1+$\alpha$1 denotes the second time codes, and TC2+$\alpha$2 denotes the third time codes. Phr denotes the reference phase information, Ph denotes the phase information, and Phd denotes the phase difference.

The relation among the reference phase information Phr, the phase information Ph, and the phase difference Phd is as in the following equation.

$$Phd = Ph - Phr \qquad (1)$$

The reference phase information Phr can be derived by calculating the actual time corresponding to the start point of each frame from TCIN of the first higher time codes and by dividing it by the frame period of the second time codes. In the case where Q(x) denotes the operation that the actual time is calculated from the first higher time codes and it is divided by the frame period of the second time codes and the quotient of the result of the division is outputted and where the operation of outputting the remainder is represented by S(x) (x is the first higher time codes TCIN), the relation among the first time codes TCIN and $\alpha$IN and the second time codes TC1 and $\alpha$1 and the third time codes TC2 and $\alpha$2, the phase difference Phd, and the reference phase information Phr is as in the following equation.

$$TC1 + \alpha 1 = Q(TCIN) + \alpha IN \qquad (2)$$

$$\alpha 1 = \alpha IN \qquad (3)$$

$$TC2 + \alpha 2 = TC1 + \alpha 1 + Phd \qquad (4)$$

$$Phr = S(TCIN) \qquad (5)$$

Therefore, in order to perform the conversion between the time codes having different periods and different phases, it is necessary to add the process Q(x) of the period conversion from the first time codes to the second time conversion and the phase conversion from the second time codes to the third time codes, that is, Phd.

In a first embodiment of this invention, Phr is calculated from the first time codes, frame timings of the second time codes are actually generated, they are compared with the frame timings of the third time codes, and thereby the phase difference Phd is calculated and the sub frame number $\alpha$2 of the third time codes is calculated.

Next, a description will be made on the structure of a time code recording and reproducing apparatus according to the first embodiment of this invention.

Figure 3:
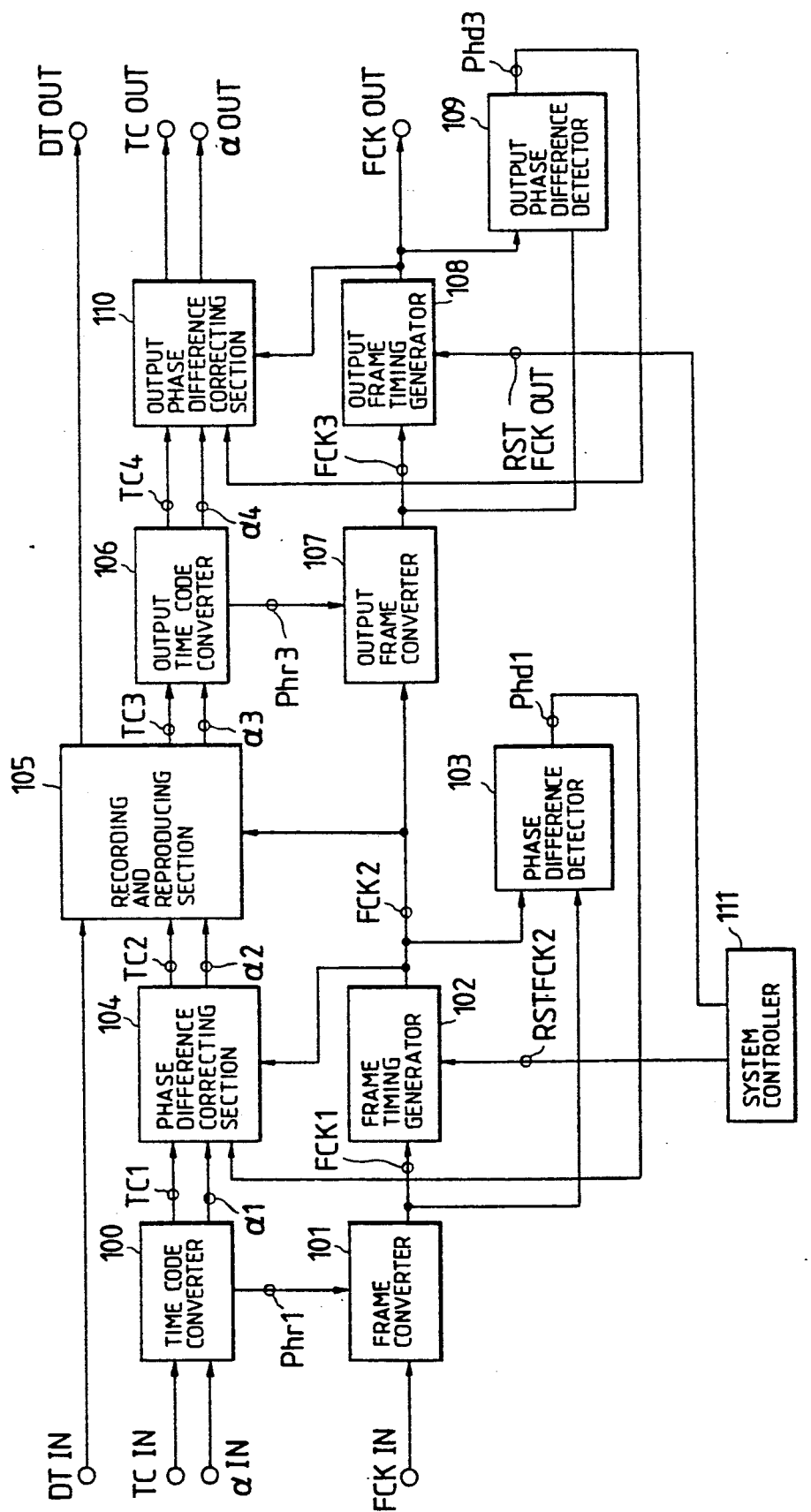
FIG. 3 is a block diagram showing the structure of a time code recording and reproducing apparatus according to a first embodiment of this invention.

FIG. 3 is a block diagram showing the structure of the time code recording and reproducing apparatus of this invention.

In FIG. 3, the numeral 100 is a time code converter which converts a higher time code TCIN and a sub frame number $\alpha$IN into a higher time code TC1 of a different frame period and a sub frame number $\alpha$1, and which calculates the reference phase information Phr1 representing the difference between the start timings of the frames of TCIN and TC1, the time codes TCIN representing times higher than the frame unit of the input time codes.

The numeral 101 is a frame converter generating frame clocks FCK1 on the basis of the reference phase information Phr1 and the input frame clocks FCKIN, the clocks FCK1 representing the timing of a head of the frame of the time codes TC1 and α1 which occur after the conversion, the information Phr1 being generated by the time code converter 100, the clocks FCKIN representing the timing of a head of the frame of the input time codes TCIN and αIN.

The numeral 102 is a frame timing generator generating the frame clocks FCK2 which determine the frame timings of the record and reproduction in a recording and reproducing section 105. In the case where a signal RSTFCK2 for resetting the FCK2 which is fed from a system controller 111 is "1", the frame timing generator 102 is reset by a frame clock FCK1 generated by the input frame converter 101 and the FCK1 and FCK2 are synchronized.

The numeral 103 is a phase difference detector which detects the phase difference between the frame clocks FCK1 and the frame clocks FCK2 and which outputs the phase difference Phd1. The numeral 104 is a phase difference correcting section which adds the time codes TC1 and α1 outputted from the time code converter 100 and the phase difference Phd1 outputted from the phase difference detector 103, and which outputs them as the time codes TC2 and α2 in synchronism with the frame clocks FCK2. The numeral 105 is a recording and reproducing section which performs the record and reproduction at a frame timing synchronous with the frame clocks FCK2 generated by the frame timing generator 102. The recording and reproducing section can be realized by an R-DAT. According to the recording and reproducing way of the rotary head type, the recording and reproducing section 105 form two inclined tracks on a tape during one period of the frame clocks FCK2 having a period of 30 msec, and records time codes of one type in unit of two tracks. The recording and reproducing section 105 outputs the time codes TC2 and α2 directly as TC3 and α3 in a recording mode, and outputs time codes reproduced from the tape as TC3 and α3 in a reproducing mode.

FIG. 4 shows an example of the time code recording format on the tape which is realized by the recording and reproducing section 105. A recording format is defined in conformity to the time code recording format of the R-DAT.

In FIG. 4, the time codes TC2 and α2 are represented by 8-byte data called a PACK. Pack Item of the o-th word is identification data denoting the characteristics of the PACK and is defined so that it will represent the time code when Pack Item="1100" for example. FLAG is flag data for memorizing the state of the input time code, and it represents the time code having a frame period of 40 msec when FLAG="0000" and it represents the time code having a frame period of 30 msec when FLAG="0001". This flag has the same form as that of the time code which is inputted during the reproduction and outputting of the time code, and can be referred to when the time code is outputted.

The sub frame numbers 1 and 2 of the first to second words are sub frame numbers in which the frame numbers are further divided, and correspond to α2 of the time code. The 16-bit data of the words 1 to 2 is divided into four parts, and 0000 to 9999 can be represented by 4 digits in the BCD format. The word 3 is hour data represented by 2 digits of BCD, and represents 0 to 23. The word 4 is minute data represented by 2 digits of BCD, and represents 0 to 59. The word 5 is second data represented by 2 digits of BCD, and represents 0 to 59. The word 6 is a frame number represented by 2 digits of BCD, and is expressed as 00 to 32 in the order of 3 n second, 00 to 32 in the order of 3n+1 second, and 00 to 33 in the order of 3n+2 (n=0, 1, 2, ..., 19). The recording and reproducing section 105 has the function of recording input PCM audio data DTIN and outputting the recorded data as output PCM audio data DTOUT. Recording and reproducing the PCM audio data are performed similarly to the time code in correspondence with the frame clocks FCK2 generated by the frame timing generator 102. In addition, the recording and reproducing section 105 can give suitable delays to the PCM audio data during the record and reproduction in consideration of time code delays which occur in the input time code converting process and the output time code converting process.

An output time code converter 106, an output frame converter 107, an output frame timing generator 108, an output phase difference detector 109, and an output phase difference correcting section 110 have functions similar to those of the respective sections 100-104 at the input side, and their description will be omitted.

In the case where a plurality of recording and reproducing apparatuses are connected and where the respective apparatuses have the function of input time code conversion such as mentioned above, the time code processing at the output side is unnecessary. In the case where it is connected with a recording and reproducing apparatus having a different frame period and not having the function of input time code conversion, the time code conversion process at the output side is necessary.

The numeral 111 is a system controller feeding frame clock reset flags RSTFCK2 and RSTFCKOUT to the frame timing generator 102 and the output frame timing generator 108, the flags instructing the resetting of frame clocks. The resetting of the frame timing generator 102 and the output frame timing generator 108 must be avoided when the recording and reproducing section 105 is doing the recording operation or when an external apparatus to which the output time codes TCOUT and αOUT are connected is doing the recording operation.

Next, a detailed description will be made on the time code conversion process in the time code recording and reproducing apparatus which is described with reference to FIG. 1.

Figure 5:
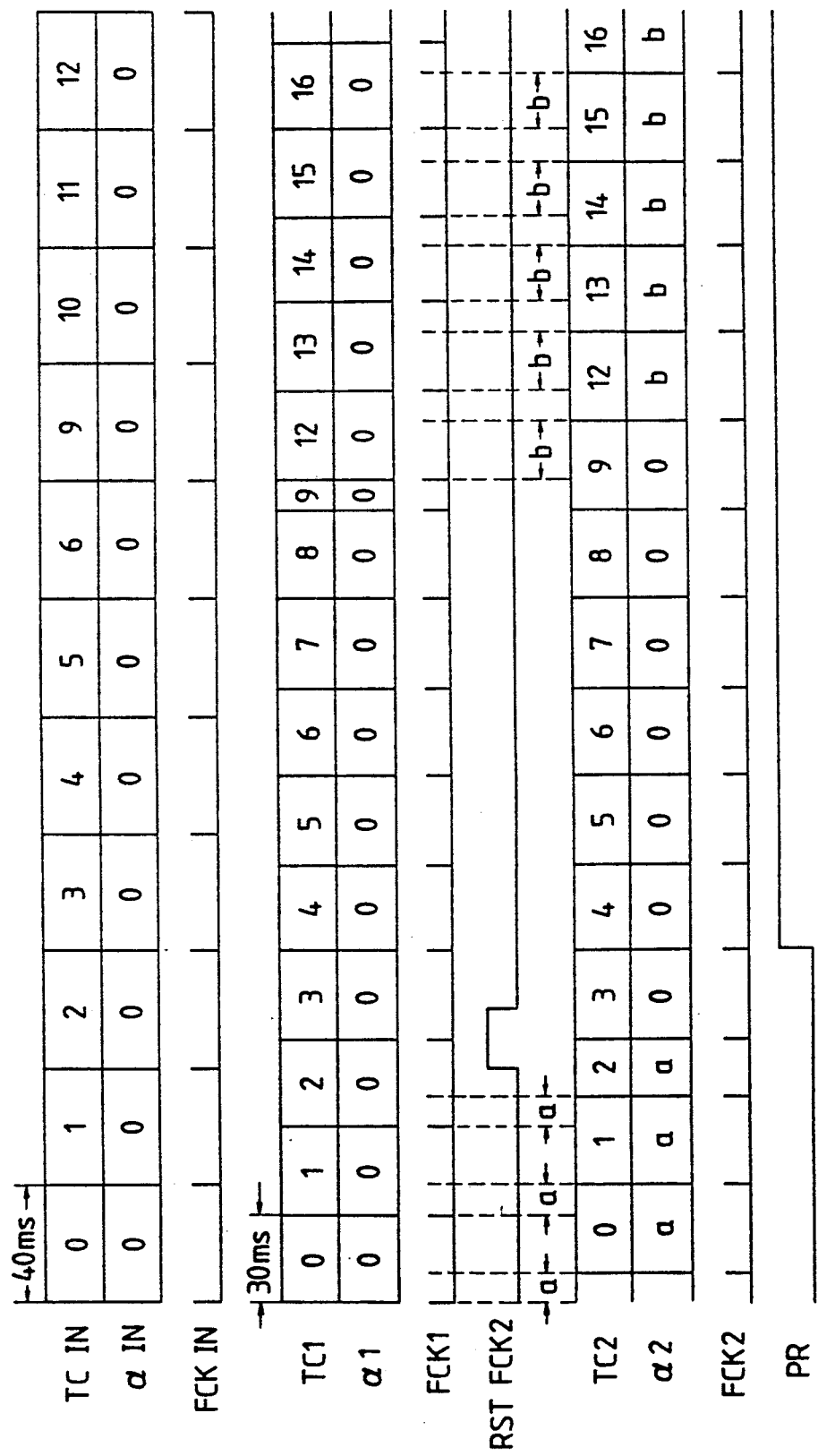
FIG. 5 is a timing chart of an input time code conversion process.

FIG. 5 is a timing chart showing the timing of the input time code conversion process.

In FIG. 5, TCIN denotes a higher time code equal to or greater than the frame number of the input time code, αIN denotes the sub frame number of the input time code, and FCKIN is an input frame clock representing the timing of a head of a frame of the input time code. In this case, the input time codes have a period of 40 msec, the sub frame number αIN maintains "0", and the higher time codes TCIN are continuous between 0 hour 0 minute 0 frame (units equal to or smaller than second will be omitted hereinafter) and 6 frame and between 9 frame and 12 frame and have a discontinuous point in the interval between 6 frame and 9 frame. The phase is continuous. The results of the conversion of this by the time code converter 100 are a sub frame number α1 and higher time codes TC1 having a frame period of 30 msec. FCK1 is a frame clock FCK1 representing a head of the frame of the time code TC1 and α1.

When TCIN and αIN are subjected to the time code conversion similarly to FIG. 1, the frame is discontinuous and the frame phase is discontinuous during the interval between 9 frame and 12 frame.

RSTFCK2 is a frame clock reset signal synchronizing the frame clocks FCK2 and the frame clocks FCK1, the clocks FCK2 being used in the recording and reproducing.

RSTFCK2 becomes active before the recording and reproducing section 105 moves into the recording mode, synchronizing the frame of the recording and reproducing section 105 and the frame of the input time codes TCIN and αIN. After the synchronization, if TCIN and αIN are continuous, the sub frame number α2 of the time code which occurs after the input conversion is equal to the sub frame number αIN of the input time code and is constant. TC2 and α2 are time codes which occur after the phase difference correction, and which are equal to the time codes TC1 and α1 plus the phase difference Phd1, the time codes TC1 and α1 occurring before the phase difference correction. During the period until the time codes TC2 and α2 which occur after the phase difference correction are reset by the frame clock reset signal RSTFCK2, since the phases of the frame clocks FCK1 and the frame clocks FCK2 used in the recording and reproducing are shifted from each other by a, the sub frame number α2 is a. After FCK2 is reset by RSTFCK2, since the phases of FCK1 and FCK2 are matched, the sub frame number α2 is "0". At the point where the change from 9 frame to 12 frame of TC2 occurs, since the frame phase is discontinuous, the phase difference Phd1 is b and the sub frame α2 which occurs after the phase difference correction is b. If the frame clock reset signal RSTFCK2 is made active at the point where the change from 9 frame to 12 frame occurs, the phase difference Phd1 can be "0". At this time, since the recording and reproducing section 105 is in the recording mode, the resetting thereof is not performed. FCK2 is frame clocks determining the frame timing of the recording and reproducing section 105, and the frame phase is constant in the recording mode.

PR is a signal representing a mode of the recording and reproducing section, and denotes the reproducing mode when it is "0" and denotes the recording mode when it is "1".

Next, the output time code conversion process will be described.

Figure 6:
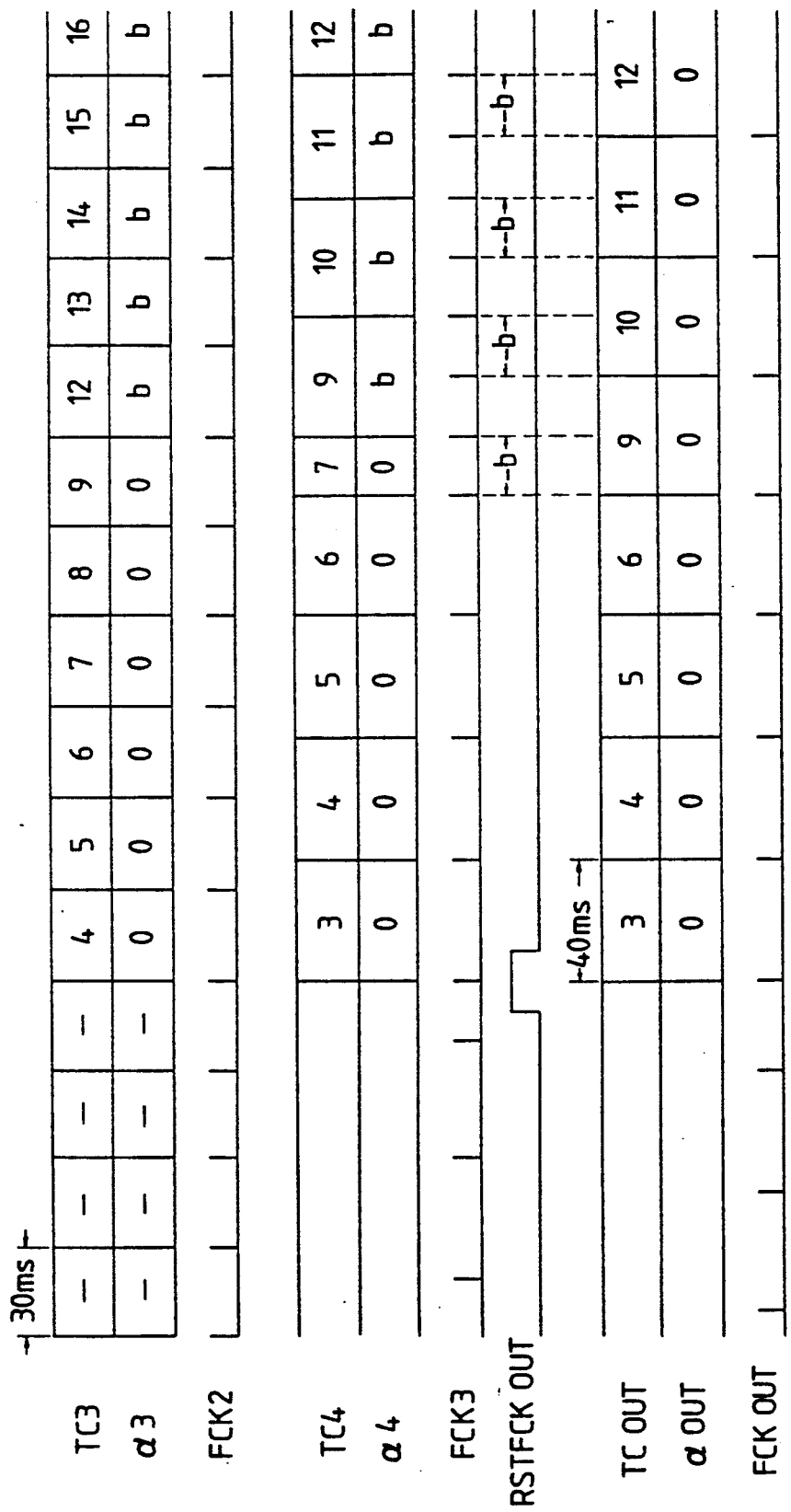
FIG. 6 is a timing chart of an output time code conversion process.

FIG. 6 is a timing chart showing the timing of the output time code conversion process. A higher time code TC3 and a sub frame number α3 are time codes which are reproduced by the recording and reproducing section 105. The recorded time codes are recorded after the time code conversion process which is described with reference to FIG. 5. In FIG. 6, the time codes TC3 and α3 are continuous between 4 frame and 9 frame, and the sub frame number α3 is "0" and is constant. During the interval between 9 frame and 12 frame, the time codes become discontinuous but the frame phase is constant. The time codes equal to or later than 9 frame are constant, and the sub frame number α3 is a constant value b. FCK2 is frame clocks determining the frame timing of the recording and reproducing section 105. A higher time code TC4 and a sub frame number α4 are time codes which occur after the output time code conversion. At the point where the time codes TC3 and α3 which occur before the output time code conversion are discontinuous, the time codes TC4 and α4 which occur after the output time code conversion are also discontinuous and the frame phase is discontinuous. RSTFCKOUT is a frame clock reset signal which resets the output frame timing generator 108. When RSTFCKOUT becomes active, the frame clocks FCK3 outputted from the output frame converter 107 can be synchronized with the frame clocks FCKOUT generated by the output frame timing generator 108. Higher time codes TCOUT and αOUT are equal to the time codes TC4 and α4 plus the phase difference Phd3 and are outputted in synchronism with the frame clocks FCKOUT, the time codes TC4 and α4 being outputted from the output time code converter 106, the phase difference being outputted from the output phase difference detector 109. The time codes TCOUT and αOUT are continuous between 3 frame and 6 frame and become discontinuous between 6 frame and 9 frame and are continuous between 9 frame and 12 frame. In this case, since the phase difference Phd1, which is generated in the input time code conversion described with reference to FIG. 5, is b, the phase difference Phd3 outputted from the output phase difference detector is −b. Therefore, the output sub frame number αOUT becomes "0". Thus, in the case where the frame periods of the input time codes TCIN and αIN and the output time codes TCOUT and αOUT are in agreement, αIN=αOUT.

Next, a time code recording and reproducing apparatus according to a second embodiment of this invention will be described with reference to drawings.

In the first embodiment of this invention, the frame clocks corresponding to the second time codes are generated by deriving the reference phase information Phr, and the phase difference Phd is calculated by measuring the phase difference from the frame clocks corresponding to the third time codes. The second embodiment is of the type in which the phase information Ph is measured and the reference phase information Phr is calculated by referring to the above-mentioned equation (1), and the phase difference Phd is derived by use of the above-mentioned equation (1) and the third time codes are determined.

Figure 7:
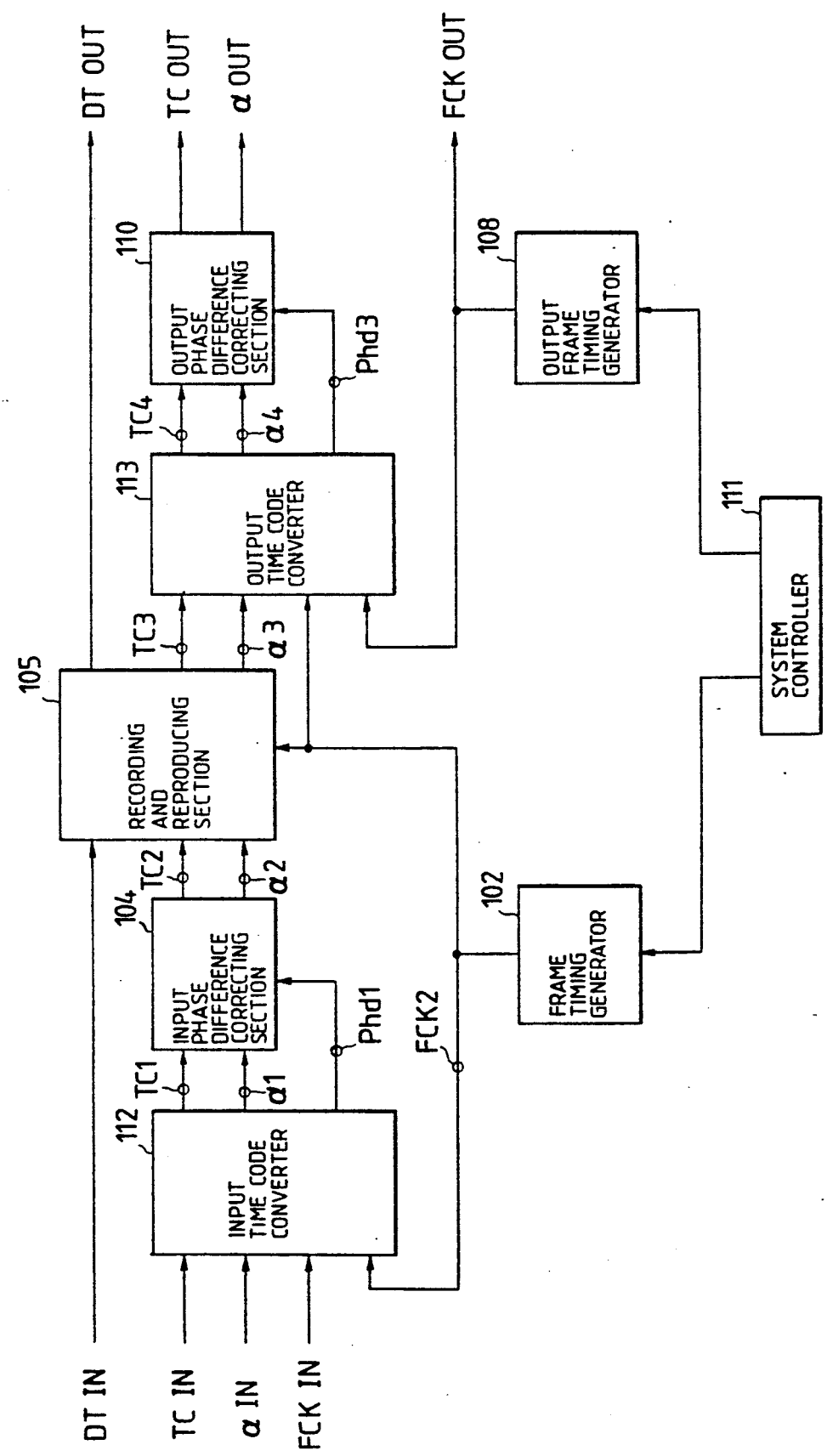
FIG. 7 is a block diagram showing the structure of a time code recording and reproducing apparatus according to a second embodiment of this invention.

FIG. 7 shows the structure of the time code recording and reproducing apparatus according to the second embodiment of this invention.

In the time code recording and reproducing apparatus according to the second embodiment of this invention, the time code converter 100, the frame converter 101, and the phase difference detector 103 of the time code recording and reproducing apparatus according to the first embodiment of this invention are replaced by an input time code converter 112, and the output time code converter 106, the output frame converter 107, and the output phase difference detector 109 are replaced by an output time code converter 113. Parts other than the above-mentioned blocks are similar to those of the time code recording and reproducing apparatus according to the first embodiment of this invention, and their description will be omitted. Since the input time code converter and the output time code converter operate similarly, they will be described together as the operation of a time code converter.

Figure 8:
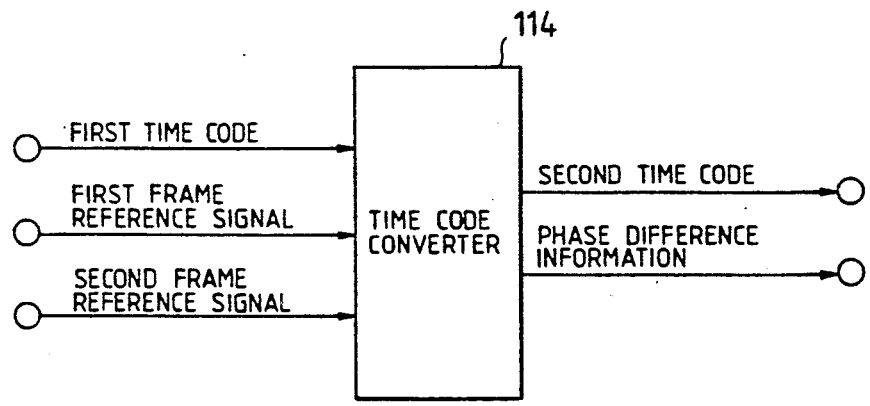
FIG. 8 is a block diagram showing input and output states of a timing code converter.

FIG. 8 is a view showing input and output with respect to the time code recording and reproducing apparatus according to the second embodiment of this invention. In FIG. 8, the numeral 114 is a time code converter which receives the first time codes, the first frame reference signal, and the second frame reference signal, and which converts them into second time codes and a phase difference and outputs them. The first time codes correspond to TCIN of FIG. 7, the first frame reference signal corresponds to FCKIN of FIG. 7, the second frame reference signal corresponds to FCK2 of FIG. 7, and the second time codes correspond to TC1 of FIG. 14. Here, αIN and α1 of FIG. 7 are 0.

Figure 9:
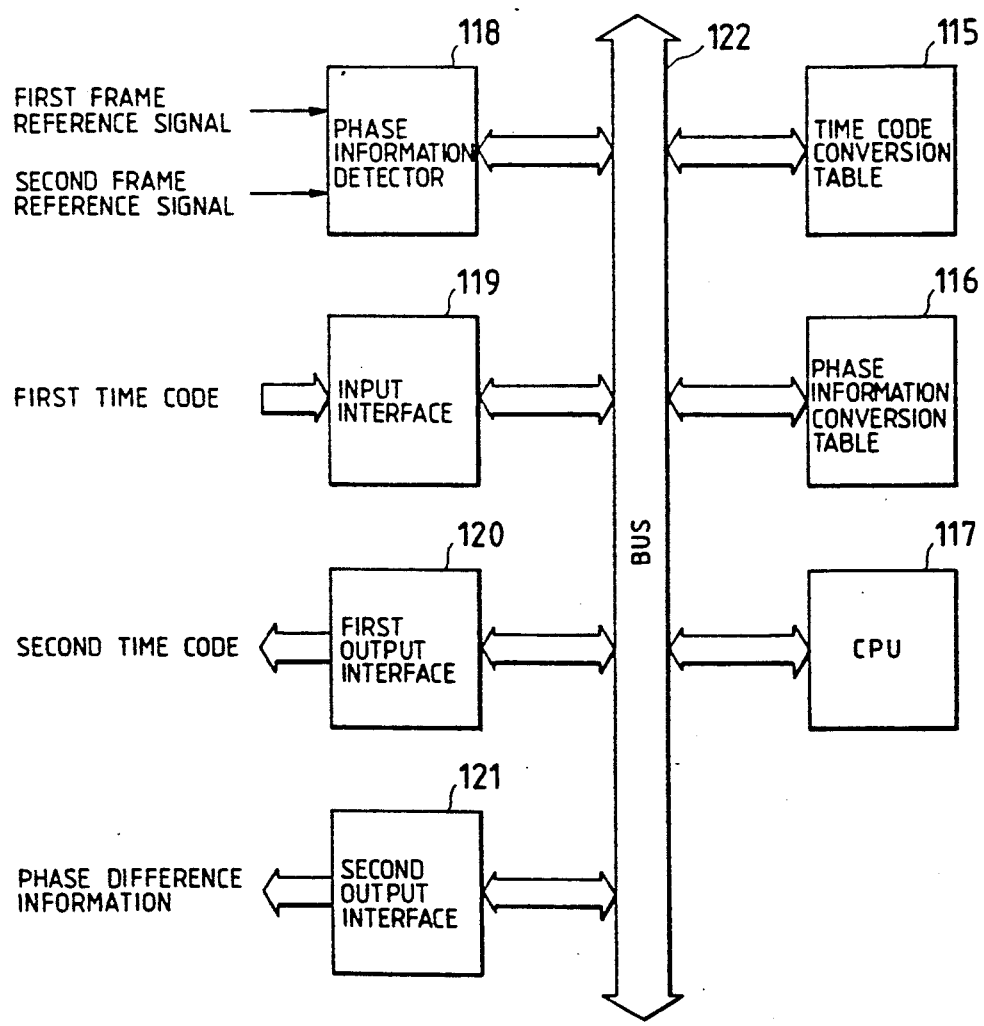
FIG. 9 is a block diagram of a time code converter in the second embodiment.

FIG. 9 shows the structure of the time code converter in the second embodiment of this invention. In FIG. 9, the numeral 115 is a time code conversion table, the numeral 116 is a phase information conversion table, the numeral 117 is a central processing unit (CPU), the numeral 118 is a phase information detector for detecting the phase information of the first frame reference signal and the second frame reference signal, the numeral 119 is an input interface for receiving the first time codes, the numeral 120 is a first output interface for outputting the second time codes, the numeral 121 is a second output interface for outputting the phase difference, and the numeral 122 is a bus for address and data. As will be appreciated by those of ordinary skill, any microprocessor, such as marketed by Motorola under the designation 68000, performs the functions of multiplication, division, addition and subtraction, and can be used to implement CPU 117 of FIG. 9.

A description will be made hereinafter on the operation of the time code converter which has the structure such as mentioned above. The input first time codes are read by the CPU 115 via the input interface 119 at a timing synchronous with the second frame reference signal. The phase information detected by the phase information detector 118 is simultaneously read by the CPU 117. The CPU 117 converts the read first time codes and the phase information into the second time codes and the phase difference by referring to the time code conversion table 115 and the phase information conversion table 116, and outputs them via the first output interface 120 and the second output interface 121 respectively.

Next, a detailed description will be made on the time code conversion process using the time code conversion table and the phase information conversion table.

In the case where the time code conversion table has a table corresponding to 24 hours and where SMPTE time codes (a frame period = 1001÷30 which approximately equals 33.37 ms) of an NTSC color VTR are converted into running times of an R-DAT (a frame period = 30 ms), the time code conversion table needs a quantity corresponding to 24 hours in unit of a frame of the R-DAT. Thus, the time code conversion table having $24 \times 60 \times 60 \times 100 \div 3 = 2.88 \times 10^5$ frames is necessary. In the case where each of hour, minute, second, and frame is expressed by two figures in the BCD form, or by one byte, 4 bytes per frame are necessary. Therefore, the time code conversion table having $1.152 \times 10^7$ bytes is necessary, and the hardware size is very large.

Accordingly, in the time code converter of this invention, the time code conversion table does not have a table corresponding to 24 hours, and it is realized by a table having a time corresponding to the least common multiple of the first frame period and the second frame period. Therefore, in the case where the first and second time codes use the SMPTE time codes of the NTSC color system and the running times of the R-DAT respectively, it is sufficient that there are 1001 frames in unit of a frame of the R-DAT in this embodiment. This equals 1/2877 times the table size which is required in the case having a table corresponding to 24 hours. Therefore, the hardware size can be greatly reduced.

The sequence of the time code conversion process using the time code conversion table and the phase information conversion table will be described hereinafter with reference to drawings, in which the first and second time codes use the SMPTE time codes of the NTSC color system and the running times of the R-DAT respectively.

Figure 10:
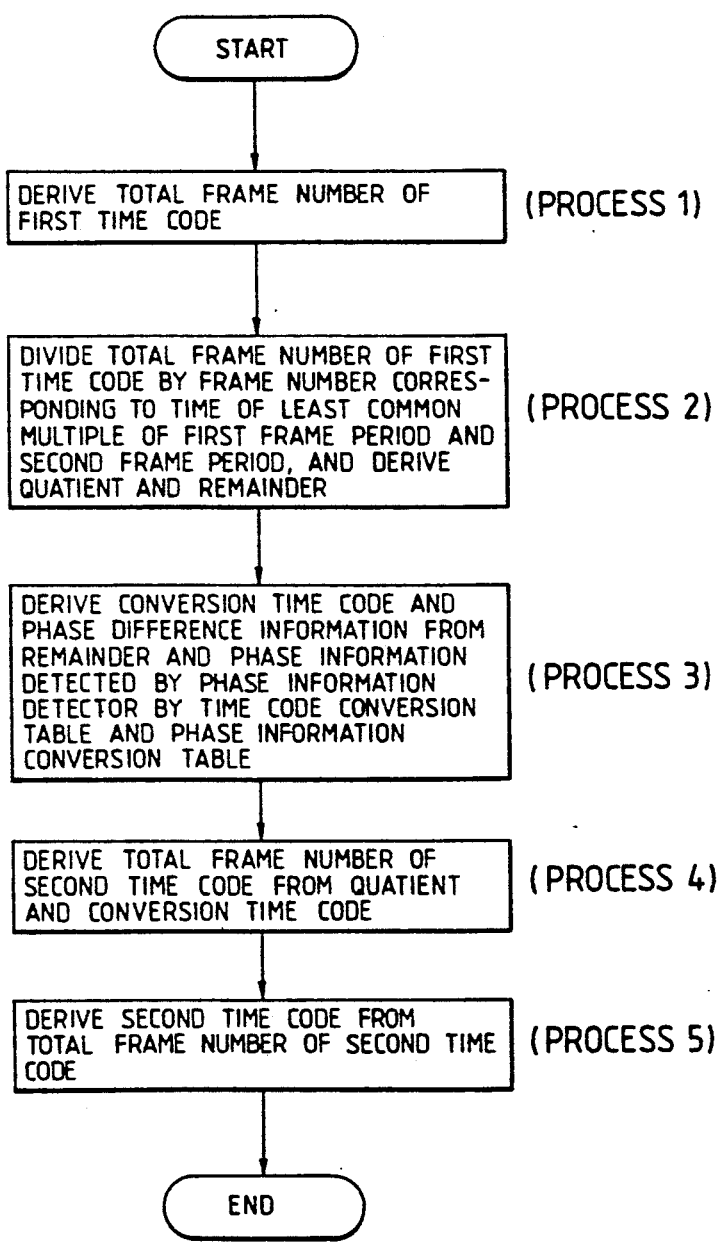
FIG. 10 is a flowchart showing a time code conversion process in the second embodiment.

FIG. 10 is a flowchart showing the time code conversion process in the second embodiment of this invention.

(Process 1)

The total frame number of the time codes having the first frame period is calculated. When hour, minute, second, and frame of the SMPTE time codes fed from the input interface 119 are represented by H, M, S, and F respectively, the total frame number (the total frame number corresponding to the time elapsed since 0 hour 0 minute 0 second 0 frame) N from 0 hour 0 minute 0 second 0 frame is given by an equation (6).

$$N = 1800 \times 60 \times H + 1800 \times M + 30 \times S + F \tag{6}$$

In the case of a drop frame, N is a value which equals N of the equation (6) minus a value corresponding to a corrective frame quantity $\{2 \times M - 2 \times INT(M \div 10) + 108 \times H\}$. INT( ) represents the function which converts a number in ( ) into an integer by omitting the figures below the first place of decimals. As will be clearly understood by those of ordinary skill in the art, the calculation processing related to equation (6) is executed by the CPU 117 of FIG. 9.

(Process 2)

The total frame number of the time codes having the first frame period is divided by the frame number of the time codes having the first frame period which corresponds to the time of the least common multiple of the first frame period and the second frame period, and the quotient and the remainder thereof are calculated. Since 900 frames of the SMPTE time codes agrees with 1001 frames of the R-DAT, the quotient K and the remainder L are given by equations (7) and (8) respectively.

$$K = INT(N \div 900) \tag{7}$$

$$L = N - K \times 900 \tag{8}$$

The calculation processing related to equations (7) and (8) is executed by the CPU 117 of FIG. 9.

(Process 3)

By referring to the time code conversion table 115 and the phase information conversion table 116, the conversion time codes having the second frame period and the phase difference are calculated from the remainder and the phase information detected by the phase information detector 118. The time code conversion table has 1001 frames in unit of a frame of the R-DAT. As the remainder L increases, the value of the conversion time codes M increases from 0 one by one and can assume the value up to 1000. The phase information conversion table has 1001 frames in unit of a frame of the R-DAT, and memorizes the reference phase information. When the phase information is represented by Ph and the reference phase information is represented by Phr, the phase difference Phd is given by an equation (1).

$$Phd = Ph - Phr \tag{1}$$

The calculation processing related to equation (1) is executed by the CPU 117 of FIG. 9.
(Process 4)
The total frame number of the time codes having the second frame period is calculated from the quotient and the conversion time codes having the second frame period. When the total frame number of the R-DAT is represented by Nd, Nd is given by an equation (9).

$$Nd = 1001 \times K + M \tag{9}$$

The calculation processing related to equation (9) is executed by the CPU 117 of FIG. 9.
(Process 5)
The time codes having the second frame period are derived from the total frame number of the time codes having the second frame period. When hour, minute, second, and frame of the running time of the R-DAT are represented by Hd, Md, Sd, and Fd respectively, Hd, Md, Sd, and Fd are given by an equation (10), an equation (11), an equation (12), and an equation (13) respectively.

$$Hd = \text{INT}(Nd \div 2000 \div 60) \tag{10}$$

$$Z1 = Nd - 2000 \times 60 \times Hd$$

$$Md = \text{INT}(Z1 \div 2000) \tag{11}$$

$$Z2 = Z1 - 2000 \times Md$$

$$Sd' = 3 \times \text{INT}(Z2 \div 100)$$

$$Z3 = Z2 - 100 \times Sd' \div 3$$

$$Sd = Sd' + \text{INT}(Z3 \div 33) - \text{INT}(Z3 \div 99) \tag{12}$$

$$Fd = Z3 - 33 \times \{\text{INT}(Z3 \div 33) - \text{INT}(Z3 \div 99)\} \tag{13}$$

where Sd', Z1, Z2, and Z3 are variables for the work. The calculation processing related to equations (10)-(13) is executed by the CPU 117 of FIG. 9.

As above, the time code converter having a small hardware can be provided by comprising the phase information conversion table and the time code conversion table having the time of the least common multiple of the first frame period and the second frame period, converting the time codes having the first frame period and the phase information detected by the phase information detector into the time codes having the second period and the phase difference by referring to the time code conversion table and the phase information conversion table, and outputting them.

Figure 11:
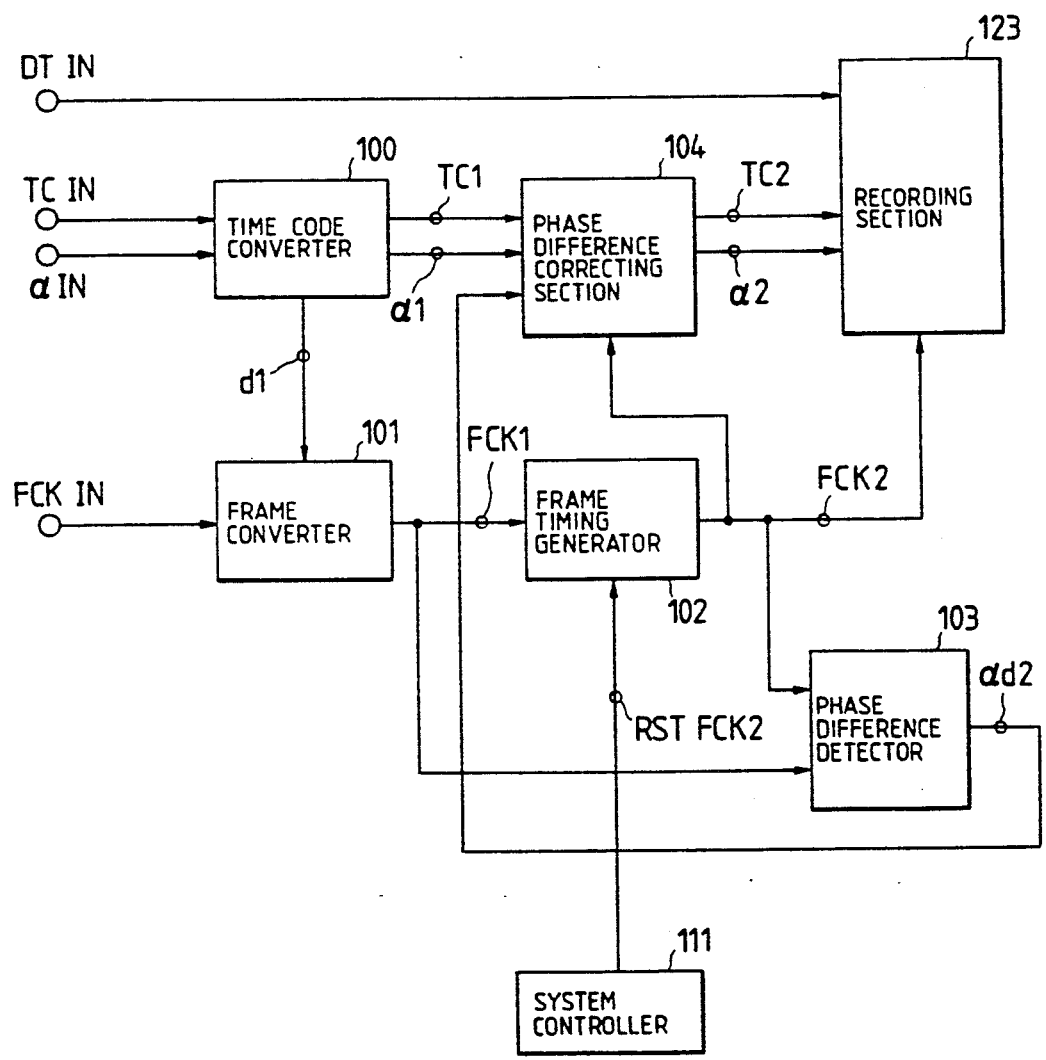
FIG. 11 is a block diagram of a time code recording apparatus according to a third embodiment of this invention.

Next, a third embodiment of this invention will be described. FIG. 11 is a block diagram showing the structure of a time code recording apparatus according to the third embodiment of this invention.

The third embodiment of this invention is formed by only the recording side of the recording and reproducing apparatus of the first embodiment of this invention. In FIG. 11, the numeral 123 denotes a recording section. The recording section can be realized by using the recording section of the R-DAT. Parts other than the recording section 123 are similar to those of the recording and reproducing apparatus of the first embodiment of this invention, and their description will be omitted. When the above-mentioned recording apparatus is applied to an apparatus exclusively for generating a prerecorded tape or to other apparatuses, the hardware at the reproducing side is unnecessary and the cost can be lowered.

Figure 12:
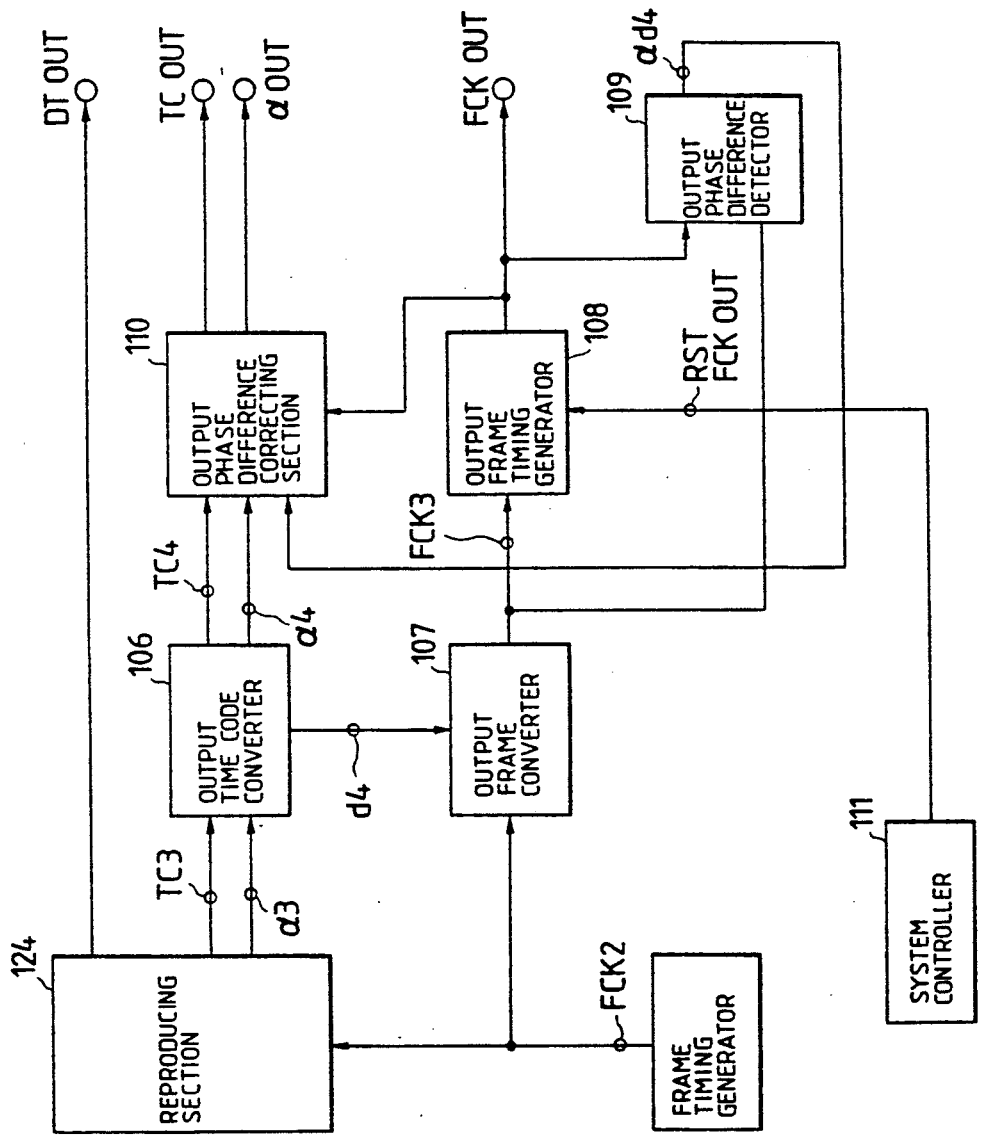
FIG. 12 is a block diagram of a time code reproducing apparatus according to a fourth embodiment of this invention.

Next, a fourth embodiment of this invention will be described. FIG. 12 is a block diagram showing the structure of a time code reproducing apparatus according to the fourth embodiment of this invention.

The fourth embodiment of this invention is formed by only the reproducing side of the recording and reproducing apparatus of the first embodiment of this invention. In FIG. 12, the numeral 124 denotes a reproducing section. The reproducing section can be realized by using the reproducing section of the R-DAT. Parts other than the reproducing section 124 are similar to those of the recording and reproducing apparatus of the first embodiment of this invention, and their description will be omitted. When the above-mentioned recording apparatus is applied to a portable type apparatus exclusively for play back or to other apparatuses, the hardware at the recording side is unnecessary and the cost can be lowered.

Figure 13:
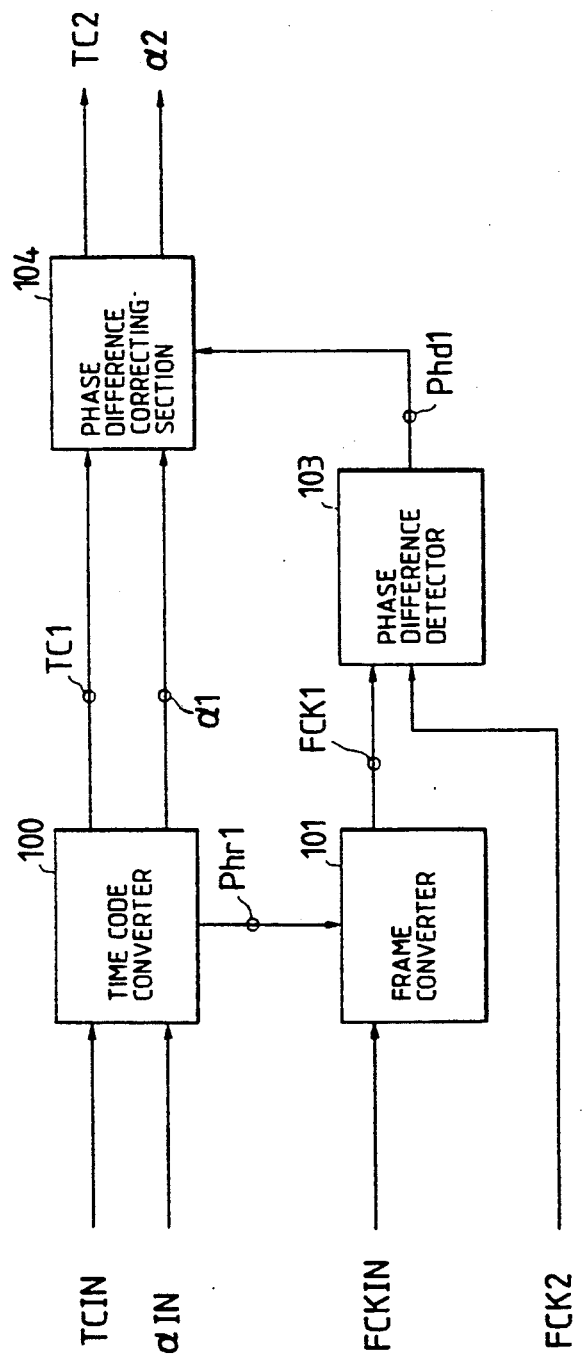
FIG. 13 is a block diagram of a time code converter in a fifth embodiment of this invention.

Next, a fifth embodiment of this invention will be described. FIG. 13 is a block diagram showing the structure of a time code converter in the fifth embodiment of this invention.

The fifth embodiment of this invention is formed by only the time code converter in the first embodiment of this invention. The structural elements are similar to those of the recording and reproducing apparatus of the first embodiment of this invention, and their description will be omitted. When the above-mentioned time code converter is combined with a recording and reproducing apparatus which does not have the function of the time code conversion, time codes having a frame period different from that of the above-mentioned recording and reproducing apparatus can be recorded and reproduced. The time code converter can be realized by the structure of the time code converter which is described with reference to the second embodiment of this invention.

INDUSTRIAL APPLICABILITY

As above, the time code recording and reproducing apparatus of this invention comprises time code converting means for a first time code into a second time code, the first time code corresponding to a given timing or a head of a frame of input information divided into frames, the second time code being different in frame period from the input information; recording means for recording the input information; recording frame timing generating means for determining a frame phase of the recording means; phase difference detecting means for detecting a phase difference between a frame of the second time code and a recording frame; phase difference correcting means for outputting a third time code which is obtained by correcting the second input time code in accordance with the phase difference; the recording means recording the third time code; and reproducing means reproducing the recorded input information and the third time code. Thereby, in the case where the input information divided into frames and the corresponding time codes are recorded, even when the frame phase of the input information differs from the frame phase of the recording means, the time codes including the sub frame number can be recorded in a manner such that the phase difference is corrected. Therefore, the relation of the correspondence between the input information and the time codes is maintained, and the information can be reproduced and edited with an accuracy higher than a frame unit. In addition, in the case where the time codes are continuous, by providing means for synchronizing the frame phases of the input information frame and the recording means, the frame phase of the input information and the frame phase of the recording means are synchronized and the sub frame number can be "0", the sub frame number being components of the time codes which are equal to or smaller than a frame unit. Therefore, it is possible to simplify the process during the editing and the head searching. For example, in the case where the frame period of the input information and the frame period of the recording means are equal, the correspondence between the input information and the time codes can be established without using the sub frame number.

By providing time code converting means for converting the frame period of the time codes corresponding to the input information, the relation of the correspondence between the input information and the time codes can be maintained with an accuracy equal to or smaller than a frame unit, in respect of the time codes and the corresponding input information having a frame period different from the frame period of the recording means. Therefore, editing with a high accuracy is enabled between apparatuses having any frame periods.

A time code converter having a small hardware can be realized by comprising a time code conversion table of the time of the least common multiple of the first frame period and the second frame period; a phase information detector detecting the phase information of the reference signal having the first frame period and the reference signal having the second frame period; and converting means for converting the time codes having the first frame period and the phase information detected by the phase information detector into the time codes having the second frame period and the phase difference by referring to the time code conversion table and the phase information conversion table.

The time code recording and reproducing apparatus of this invention can be applied to not only an apparatus able to perform the recording and reproducing but also an exclusively reproducing apparatus or an exclusively recording apparatus, and can be formed as an independent time code converter for use connected with a normal recording and reproducing apparatus.

We claim:

1. A time code converter of a time code recording and reproducing apparatus comprising a time code conversion table having conversion data for a period of a least common multiple of a first frame period and a second frame period; a phase information conversion table having conversion data for said period of the least-common-multiple of the first frame period and the second frame period; a phase information detector detecting phase information of a reference signal having the second frame period and a reference signal having the first frame period; and converting means for converting a time code having the first frame period and the phase information detected by the phase information detector into a time code having the second frame period and a phase difference by referring to the time code conversion table and the phase information conversion table.

2. The time code converter of claim 1 wherein the converting means comprises means for deriving a total frame number of time codes having the first frame period; means for dividing a total frame number from an initial time to the time indicated by the time codes having the first frame period by a number of frames with the first frame period which indicates the period of a least common multiple of the first frame period and the second frame period and for calculating a quotient and a remainder thereof; means for deriving the phase difference and conversion time codes having the second frame period from the remainder and the phase information detected by the phase information detector by referring to the time code conversion table and the phase information conversion table; means for deriving a total frame number of time codes having the second frame period from the quotient and conversion time codes having the second frame period; and means for deriving the time codes having the second frame period from the total frame number of the time codes having the second frame period.

3. The time code converter of claim 2 wherein said means for dividing operates for dividing the total frame number from an initial time of 0 hour 0 minute 0 second 0 frame to the time indicated by said time codes having the first frame period by said number of frames and for calculating said quotient and said remainder.

* * * * *

UNITED STATES PATENT AND TRADEMARK OFFICE
CERTIFICATE OF CORRECTION

PATENT NO. : 5,146,448

DATED : September 8, 1992

INVENTOR(S) : Tatsuya ADACHI et al.

It is certified that error appears in the above-identified patent and that said Letters Patent is hereby corrected as shown below:

On the title page, please insert item [30] as follows:

--[30]  Foreign Applicaiton Priority Data

March 14, 1988 [JP] . . . . . . . . . . . 63-59695

April 4, 1988 [JP] . . . . . . . . . . . . 63-24229

October 3, 1988 [JP] . . . . . . . . . . 63-249208--

Signed and Sealed this

Sixth Day of December, 1994

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,146,448
DATED : September 8, 1992
INVENTOR(S) : Tatsuya ADACHI et al.

It is certified that error appears in the above-indentified patent and that said Letters Patent is hereby corrected as shown below:

On the title page, please insert item [30] as follows:

--[30]   Foreign Application Priority Data
February 4, 1988 [JP] . . . . . . . . . . 63-24229
March 14, 1988 [JP] . . . . . . . . . . . 63-59695
October 3, 1988 [JP] . . . . . . . . . . 63-249208--

This certificate supersedes Certificate of Correction issued December 6, 1995.

Signed and Sealed this

Twenty-ninth Day of August, 1995

Attest:

BRUCE LEHMAN

*Attesting Officer*     *Commissioner of Patents and Trademarks*